H. M. CLEMONS.
Horseshoe.

No. 206,003. Patented July 16, 1878.

Witnesses
John W. Parker
James Butler

Inventor
Hiram M. Clemons

UNITED STATES PATENT OFFICE.

HIRAM M. CLEMONS, OF GOLD HILL, NEVADA.

IMPROVEMENT IN HORSESHOES.

Specification forming part of Letters Patent No. 206,003, dated July 16, 1878; application filed May 7, 1878.

*To all whom it may concern:*

Be it known that I, HIRAM M. CLEMONS, of Gold Hill, in the county of Storey and the State of Nevada, have invented a new and useful Improvement in Horseshoes, of which the following is a specification:

It is a well-known fact that nature intended a horse should bear his weight on the frog of his foot, as in that portion the natural spring or elasticity exists which was given it to avoid jars to the body, and all colts before being shod walk in this manner. With the ordinary horseshoe this frog has no support whatever, the support being on the toe and quarter, which latter is the weak portion of a horse's hoof.

My improvement consists in constructing a shoe which shall give a support directly under the frog, thus enabling a horse to walk as nature intended. It is fully illustrated by the accompanying drawing.

Figure 1:
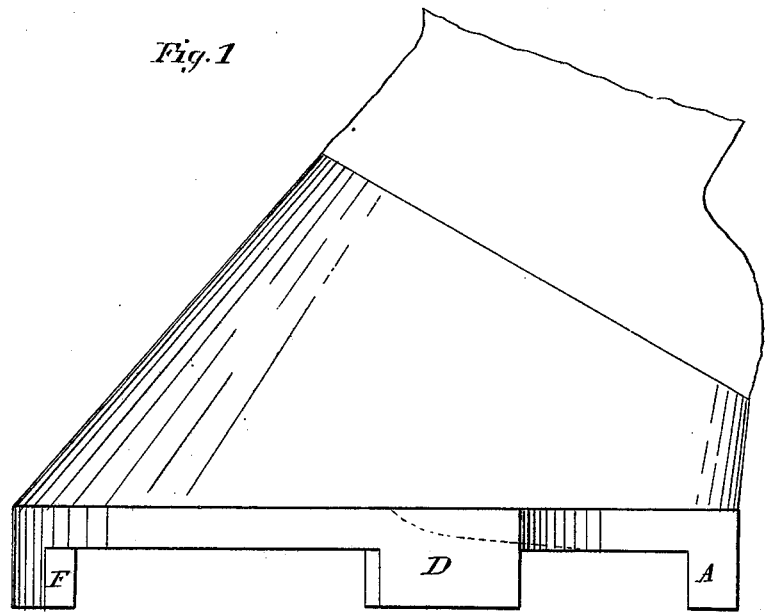
Figure 2:
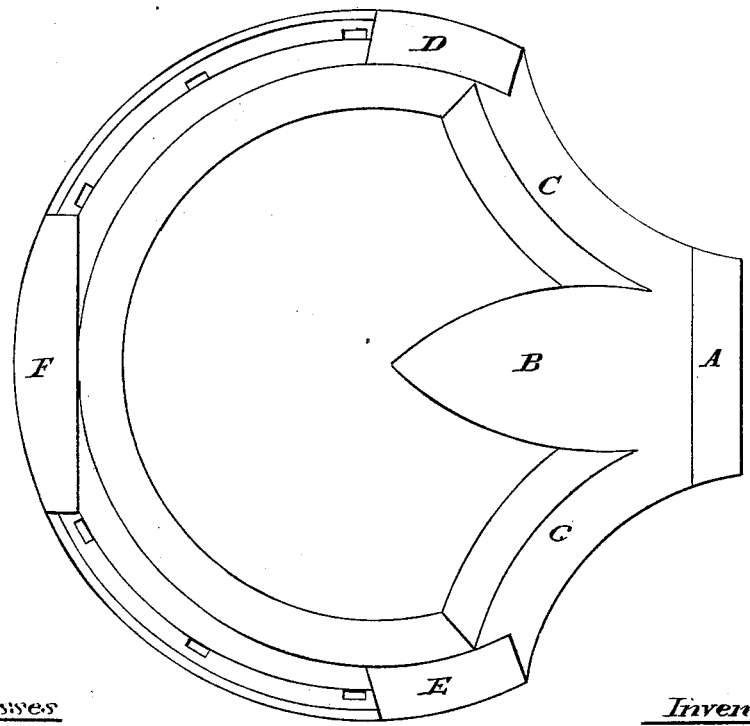

Figure 1 is a side elevation of the shoe on the horse's hoof, and Fig. 2 is a plan of the bottom.

A is the support under the heel of the foot, and the piece B, extending forward from this heel-support and terminating in a point, is what sustains the frog of the foot. This portion of the shoe is connected with the remaining portion, as shown in drawing, by side pieces C C, thus making a continuous shoe.

It will be seen that this shoe has four supports or calks, A E F D, one each at the toe and heel and one on each side, thus giving the horse a firmer hold on the ground than with the ordinary shoe. The other advantages of this shoe are as follows: It will prevent what are known as "quarter-cracks" in the horse's hoof, which are occasioned in wearing the common shoe by the sinking down of the frog through having no support. It prevents lameness caused by going downhill, where a horse must, of course, strike heel first, by giving him the support where the foot has the elasticity. It will also cure corns.

This shoe does not extend as far back on the outside of the hoof as the ordinary shoe, which, I think, is an improvement on account of easing that portion of the hoof which is the weakest.

I am aware that horseshoes have been heretofore constructed having a bar with one end welded or riveted to the toe of the shoe, and extending back beneath the frog of the foot as a support therefor; also, that a bar not attached to the shoe, but held in place thereby, and designed to confine a pad or rest upon the bottom of the foot, has been heretofore used, and I do not claim, broadly, either of these modes; but

What I claim, and desire to secure by Letters Patent, is—

A horseshoe formed with the frog-rest B, having the heel-calk A, and united to the shoe by the side pieces C C, the whole forming one continuous shoe, substantially as and for the purpose set forth.

HIRAM MAINE CLEMONS.

Witnesses:
    JOHN W. PARKER,
    JAMES BUTLER.